United States Patent
Naganuma et al.

(10) Patent No.: US 7,092,741 B2
(45) Date of Patent: Aug. 15, 2006

(54) MOBILE COMMUNICATION TERMINAL AND DISPLAY CONTROL METHOD

(75) Inventors: Takefumi Naganuma, Kyoto (JP); Masayuki Tsuda, Tokyo (JP); Hideyuki Nagasawa, Kanagawa (JP); Eriko Oseki, Kanagawa (JP); Fukiko Maeda, Kanagawa (JP); Nobuyuki Watanabe, Saitama (JP); Mao Asai, Kanagawa (JP); Takashi Kondo, Tokyo (JP); Kazuhiro Yamada, Kanagawa (JP); Dai Kamiya, Chiba (JP)

(73) Assignee: NTT DoCoMo, Inc., Tokyo (JP)

( * ) Notice: Subject to any disclaimer, the term of this patent is extended or adjusted under 35 U.S.C. 154(b) by 77 days.

(21) Appl. No.: 10/496,783

(22) PCT Filed: Dec. 5, 2002

(86) PCT No.: PCT/JP02/12777

§ 371 (c)(1),
(2), (4) Date: Jun. 4, 2004

(87) PCT Pub. No.: WO03/048916

PCT Pub. Date: Jun. 12, 2003

(65) Prior Publication Data

US 2004/0248622 A1    Dec. 9, 2004

(30) Foreign Application Priority Data

Dec. 7, 2001    (JP) .............................. 2001-374605

(51) Int. Cl.
*H04M 1/00* (2006.01)
(52) U.S. Cl. ................. 455/566; 455/419; 345/530
(58) Field of Classification Search ............... 455/414, 455/419, 575.3, 414.1; 345/530, 173
See application file for complete search history.

(56) References Cited

U.S. PATENT DOCUMENTS

2002/0000991 A1* 1/2002 Lehtonen .................... 345/530

(Continued)

FOREIGN PATENT DOCUMENTS

JP           06-224825           8/1994

(Continued)

OTHER PUBLICATIONS

U.S. Appl. No. 10/497,656, filed Jun. 4, 2004, Naganuma et al.
U.S. Appl. No. 10/496,783, filed Jun. 4, 2004, Naganuma et al.

*Primary Examiner*—George Eng
*Assistant Examiner*—Phuoc Doan
(74) *Attorney, Agent, or Firm*—Oblon, Spivak, McClelland, Maier & Neustadt, P.C.

(57) ABSTRACT

In order to perform control to optimize a display area during the execution of application software, the cellular phone 1 according to the present invention communicates with an application software distribution apparatus for distributing application software and is characterized by comprising a display unit 5 that includes a display screen 51 and serves to display information on the display screen 51; a wireless unit 7 for receiving, from the application software distribution apparatus, application software, and attribute data that indicates an assumed display area that is to be used as a display area during execution of the application software; and a control unit 2 for controlling the display area of the application software in the display screen 51 of the display 5 on the basis of the attribute data received by the wireless unit 7 and displayable area data that indicates the displayable area of the display screen 51.

11 Claims, 8 Drawing Sheets

U.S. PATENT DOCUMENTS

| | | | |
|---|---|---|---|
| 2002/0132610 A1* | 9/2002 | Chaplin et al. | 455/414 |
| 2004/0002325 A1* | 1/2004 | Evans et al. | 455/414.1 |
| 2005/0014494 A1* | 1/2005 | Owen et al. | 455/419 |
| 2005/0130720 A1* | 6/2005 | Finke-Anlauff | 455/575.3 |

FOREIGN PATENT DOCUMENTS

| | | |
|---|---|---|
| JP | 11-194756 | 7/1999 |
| JP | 2000-310986 | 11/2000 |

* cited by examiner

MOBILE COMMUNICATION TERMINAL AND DISPLAY CONTROL METHOD

TECHNICAL FIELD

The present invention relates to a mobile communication terminal and a display control method which make it possible to control a display area during execution of application software.

BACKGROUND ART

The design of application software which is downloaded to and executed on a mobile communication terminal such as a cellular phone is generally carried out with the pixels in the display screen of the mobile communication terminal being considered as coordinates. Therefore, in cases where the designed application software display area, and the displayable area of the display screen of the mobile communication terminal on which this application software is executed are the same, the images of the application software are displayed so as to match the display screen.

However, in cases where the display area of the application software is smaller than the displayable area of the display screen in which the application software is executed, the corresponding images are displayed inclined toward the top left of the display screen, and, for example, the appearance of application software for the receiving screen is not favorable.

Further, in cases where the display area of the application software is larger than the displayable area of the display screen on which this application software is executed, part of the corresponding images is cut from the top of the display screen and not displayed.

In order to resolve these problems, complex processing has been required such as processing that prepares application software display area sizes for each displayable area of a variety of mobile communication terminals and that performs distribution by allocating application software to each mobile communication terminal.

Accordingly, the present invention was conceived with the foregoing in view, and an object thereof is to provide a mobile communication terminal and a display control method that obviate the need for complex processing of the kind described above and make it possible to perform control such that the display area during execution of application software is optimum.

DISCLOSURE OF THE INVENTION

In order to achieve the above object, the mobile communication terminal according to the present invention is characterized by comprising: displaying means that include a display screen and that serve to display information on this display screen; receiving means for receiving application software, and attribute data that indicates ah assumed display area that is to be used as a display area during execution of the application software; and controlling means for controlling the display area of the application software in the display screen of the displaying means on the basis of the attribute data received by the receiving means and displayable area data that indicates the displayable area of the display screen.

In the above mobile communication terminal, the receiving means receive application software, and attribute data that indicates an assumed display area that is to be used as a display area during execution of the application software. Therefore, the controlling means are capable of controlling the display area of the application software in the display screen of the displaying means on the basis of the received attribute data and displayable area data, whereby the application software can be executed using an optimum display area. Further, the order in which the receiving means receive the application software and the attribute data is such that either the application software or the attribute data may be received first. Also, areas in the display area, the assumed display area and the displayable area are areas whose units are the pixels of the display screen and which are perceived as sets of these pixels. Here, the display area is the application software display area in the display screen during execution of the application software.

Further, the mobile communication terminal according to the present invention can also adopt the following constitutional form as a mobile communication terminal for communicating with an application software distribution apparatus. That is, the mobile communication terminal according to the present invention is a mobile communication terminal for communicating with an application software distribution apparatus that distributes application software, and may adopt a constitution comprising: displaying means that include a display screen and that serve to display information on this display screen; receiving means for receiving, from the application software distribution apparatus, the application software, and attribute data that indicates an assumed display area that is to be used as a display area during execution of the application software; and controlling means for controlling the display area of the application software in the display screen of the displaying means on the basis of the attribute data received by the receiving means and displayable area data that indicates the displayable area of the display screen.

The above-described controlling means preferably comprise: judging means for judging whether or not the assumed display area fits into the displayable area on the basis of the attribute data and the displayable area data; size setting means which, in cases where the result of the judgment by the judging means is that the assumed display area fits into the displayable area, set the size of the assumed display area as the size of the display area, and which, in cases where the assumed display area exceeds the displayable area, set a size which is produced as a result of reducing the size of the assumed display area so that the assumed display area fits into the displayable area as the size of the display area; and position setting means for setting the position of the display area to a predetermined position in the displayable area so that the display area whose size has been set by the size setting means fits into the displayable area.

The judging means judge whether or not the assumed display area fits into the displayable area on the basis of the attribute data and the displayable area data, and in cases where the judgment result is that the assumed display area exceeds the displayable area, the size setting means set a size which is produced as a result of reducing the size of the assumed display area so that the assumed display area fits into the displayable area as the size of the display area, and the position setting means set the position of the display area to a predetermined position in the displayable area so that the display area whose size has been set by the size setting means fits into the displayable area. As a result, even in cases where the assumed display area of the application software has been designed with a size that exceeds the displayable area of the display screen, it is possible to prevent part of the image from being cut from the top of the display screen.

In addition, the controlling means preferably comprise: prohibiting means which, in cases where the displaying means do not comprise a reduced display function for the display screen and the assumed display area exceeds the displayable area, prohibit the setting of the size of the display area which is performed by the size setting means. This means that the present invention is also applicable to a mobile communication terminal whose display means do not comprise a reduced display function for the display screen.

Further, the size setting means may set a size which is produced as a result of enlarging the size of the assumed display area within a range that fits into the displayable area as the size of the display area in cases where the result of the judgment by the judging means is that the assumed display area fits into the displayable area. This means that if, in cases where the assumed display area of the application software is much smaller than the displayable area of the mobile communication terminal, a size which is produced as a result of enlarging the size of the assumed display area within a range that fits into the displayable area is made the size of the display area, user convenience in using this mobile communication terminal can be improved.

Moreover, the predetermined position is preferably approximately at the center of the displayable area. This means that, generally, when an image of the application software is displayed approximately at the center of the display screen, it is also possible to provide a favorable appearance and to increase user convenience.

Here, the mobile communication terminal may further comprise designating means which allow the user to designate a predetermined position. This means that it is possible to fulfill individual user requests and to improve user convenience further.

However, when the invention for the above-described variety of mobile communication terminals is presented from the perspective of a display control method, the following description may be provided. This is based on the same technological idea as the above mobile communication terminal invention, and the resolving means are also based on the same idea as that above.

In order to resolve the above object, the display control method according to the present invention is a display control method which is executed by a mobile communication terminal comprising displaying means that include a display screen and that serve to display information on the display screen, characterized by comprising: a receiving step of receiving application software, and attribute data that indicates an assumed display area that is to be used as a display area during execution of the application software; and a controlling step of controlling the display area of the application software in the display screen of the displaying means on the basis of the attribute data received in the receiving step and displayable area data that indicates the displayable area of the display screen.

Further, the display control method according to the present invention can also adopt the following form as a display control method which is executed by a mobile communication terminal for communicating with an application software distribution apparatus. In other words, the display control method according to the present invention is a display control method which is executed by a mobile communication terminal for communicating with an application software distribution apparatus that distributes application software, which mobile communication terminal comprises displaying means that include a display screen and that serve to display information on the display screen, wherein the display controlling method may adopt a form comprising: a receiving step of receiving, from the application software distribution apparatus, the application software, and attribute data that indicates an assumed display area that is to be used as a display area during execution of the application software; and a controlling step of controlling the display area of the application software in the display screen of the displaying means on the basis of the attribute data received in the receiving step and displayable area data that indicates the displayable area of the display screen.

The above-described controlling step preferably comprises: a judging step of judging whether or not the assumed display area fits into the displayable area on the basis of the attribute data and the displayable area data; a size setting step of setting the size of the assumed display area as the size of the display area in cases where the result of the judgment in the judging step is that the assumed display area fits into the displayable area, and of setting a size which is produced as a result of reducing the size of the assumed display area so that the assumed display area fits into the displayable area as the size of the display area in cases where the assumed display area exceeds the displayable area; and a position setting step of setting the position of the display area to a predetermined position in the displayable area so that the display area whose size has been set in the size setting step fits into the displayable area.

In addition, in cases where the displaying means do not comprise a reduced display function for the display screen and the assumed display area exceeds the displayable area, the setting of the size of the display area in the size setting step is preferably prohibited.

Further, in cases where the result of the judgment in the judging step is that the assumed display area fits into the displayable area, the size setting step sets a size which is produced as a result of enlarging the size of the assumed display area within a range that fits into the displayable area as the size of the display area.

Further, the predetermined position is approximately at the center of the displayable area.

The above object of the present invention as well as other characteristics and benefits thereof will be evident to the persons skilled in the art by reading the detailed description that follows with reference to the attached drawings.

BRIEF DESCRIPTION OF THE DRAWINGS

FIG. 8C shows an example of an application software display on the display screen in a case where the assumed display area size is smaller than the displayable area size and when the display function is ON.

BEST MODES FOR CARRYING OUT THE INVENTION

Embodiments of the present invention will be described in detail hereinbelow by referring to the attached drawings. Further, in the following description of the embodiments and in the attached drawings, "application software" is abbreviated to "application".

FIRST EMBODIMENT

Figure 1:
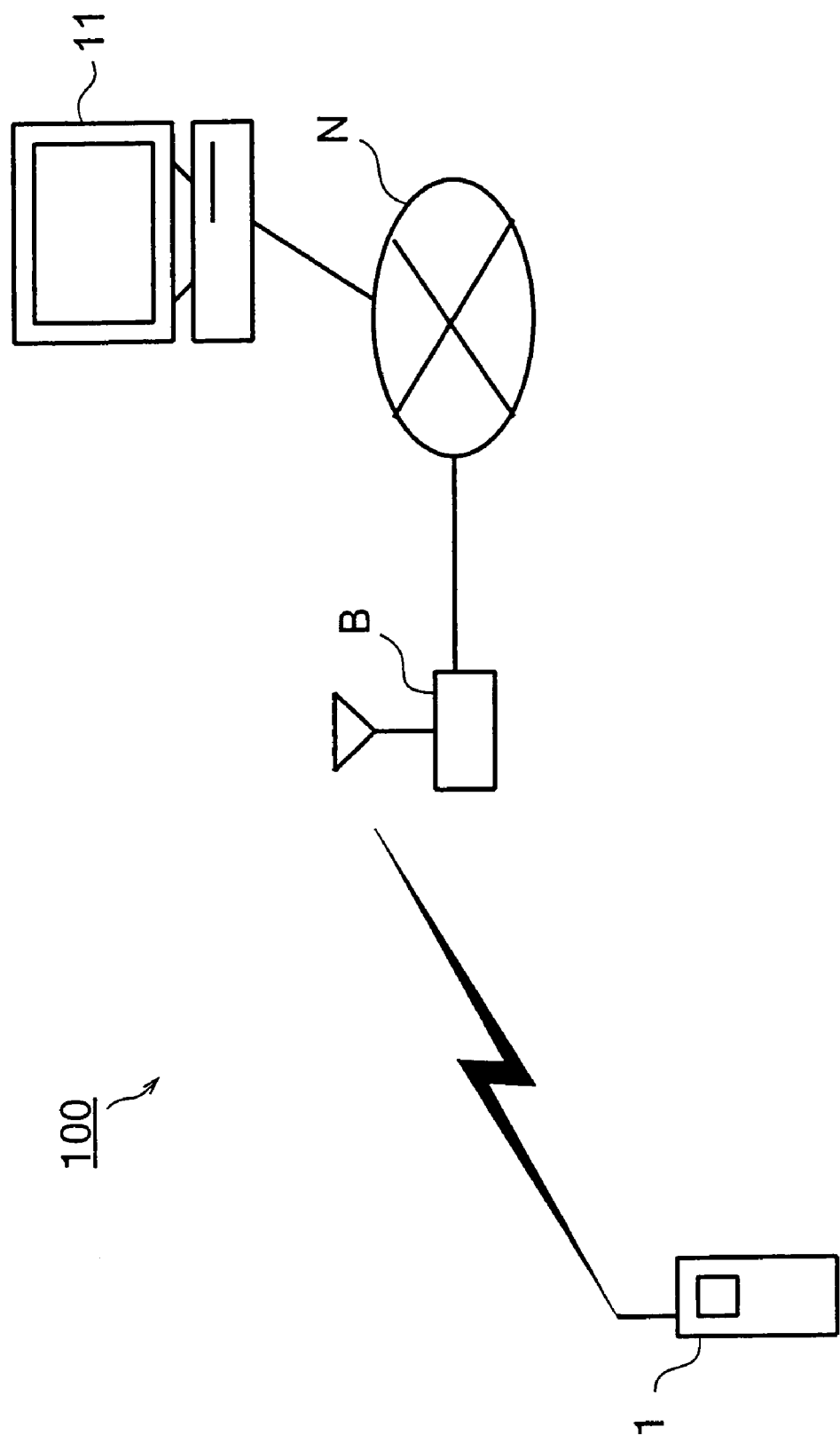
FIG. 1 is a schematic diagram showing an example of the overall constitution of an application distribution system.

First, the constitution of the apparatus according to the first embodiment will be described. FIG. 1 is a schematic diagram showing an example of the overall constitution of an application distribution system 100 according to the first embodiment. As shown in FIG. 1, the application distribution system 100 is constituted comprising a cellular phone 1 (corresponds to the mobile communication terminal) and an application distribution server 11. The cellular phone 1 is connected to a packet communications network N via a base station B. Further, the application distribution server 11 is connected via a wire line to the packet communication network N.

Figure 2:
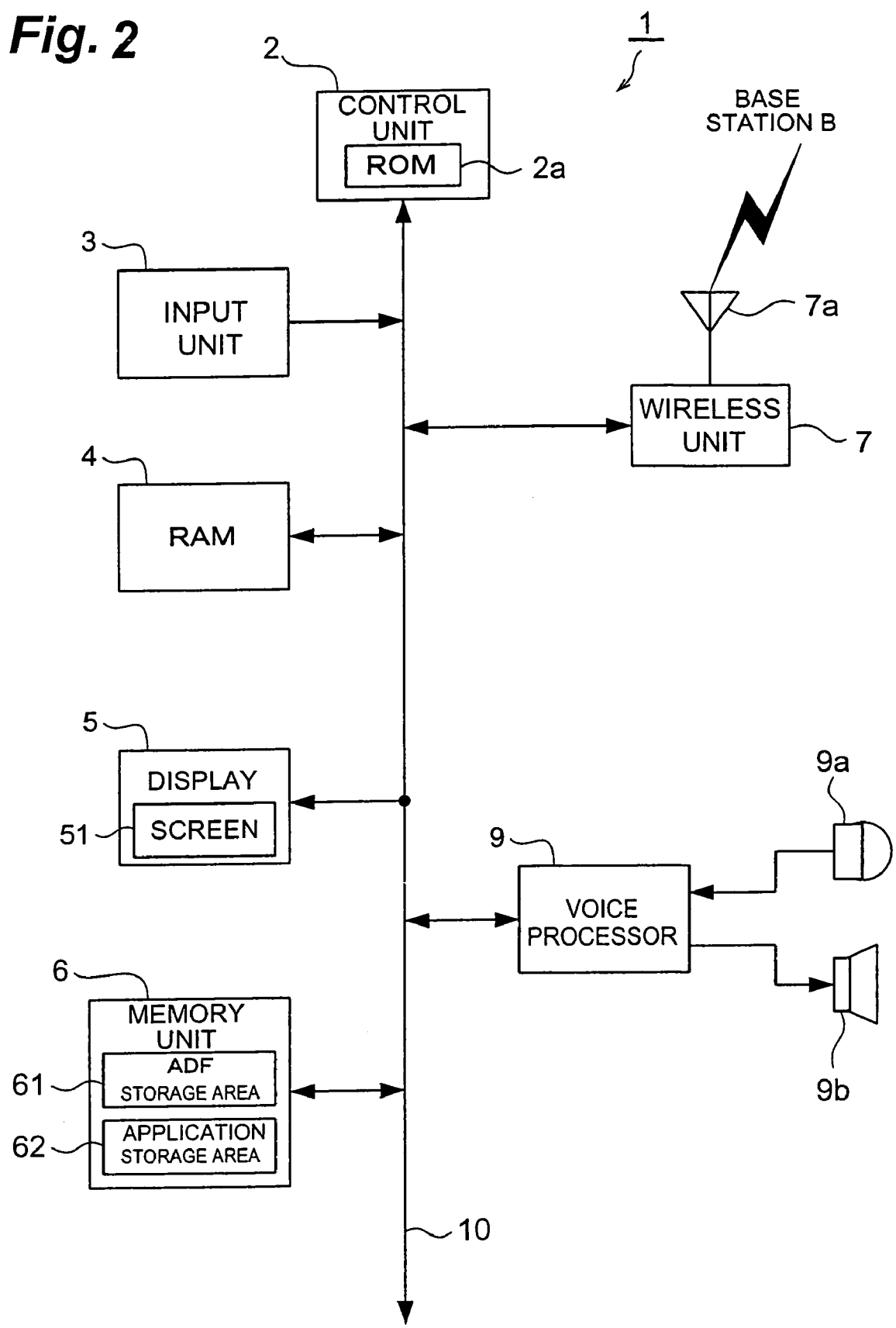
FIG. 2 is a block diagram showing the functional constitution of a cellular phone.

The internal constitution of the cellular phone 1 will be described in detail hereinbelow by referring to FIG. 2. FIG. 2 is a block diagram showing the functional constitution of the cellular phone 1. As shown in FIG. 2, the cellular phone 1 is constituted by a control unit 2 (corresponds to the controlling means), an input unit 3 (corresponds to the designating means), a RAM 4, a display 5 (corresponds to the display means), a memory unit 6, a wireless unit 7 (corresponds to the receiving means), and a voice processor 9, and these components are connected so as to permit inputs and outputs of a variety of signals via a bus 10.

The control unit 2 contains a ROM 2a, reads out programs that are pre-stored in the ROM 2a and expands these programs in the RAM 4 so as to perform centralized control of the components in accordance with these programs. In other words, the control unit 2 executes cellular phone processing (see FIG. 6) that will be described subsequently, in accordance with input-signals inputted by the input unit 3 and with programs expanded in the RAM 4. Further, in the course of this processing, the execution of an application which is downloaded from the application distribution server 11 is launched.

The input unit 3 is constituted comprising a variety of operation buttons for instructing the ON/OFF of the power supply and the selection of functions, and so forth. As a result of pushing this variety of operation buttons separately or in combination, input-signals are outputted to the control unit 2 in accordance with the contents of the instruction.

The RAM 4 is constituted by a semiconductor and so forth and, in the varied processing which is executed by the control unit 2, temporarily stores programs which is read out from the ROM 2a and data which is read out from the memory unit 6. In addition, the RAM 4 also functions as a VRAM (Video RAM) for temporarily storing data which is displayed on the display 5.

The display 5 comprises a screen 51, and is constituted by an LCD (Liquid Crystal Display) and EL (Electro Luminescence) and the like, and displays images and other display data on the screen 51 in accordance with display signals which are inputted by the control unit 2. When displaying display data on the screen 51, the display 5 comprises an enlarged display function that displays the display data after enlarging same as well as a reduced display function that displays the display data after reducing same. Further, the displayable area data that indicates the displayable area of this screen 51 is pre-stored in the ROM 2a of the control unit 2. The displayable area data expresses the vertical and horizontal sizes of the screen 51 in numbers of pixels (that is, the units are [dot]).

The memory unit 6 is constituted by a nonvolatile semiconductor memory such as an EEPROM (Electrically Erasable and Programmable ROM) and stores data which is required in order to allow the control unit 2 to execute all kinds of processing, and data which is created as a result of execution of such processing, and other data. For example, the memory unit 6 forms an ADF storage area 61 and an application storage area 62 at the time of the execution of the application processing by the cellular phone and which will be described in detail subsequently.

The ADF storage area 61 is a data area that stores a file constituted by data pertaining to attributes of applications which are executable by the cellular phone 1 as an "ADF (Attribute Definition File)".

Figure 3:
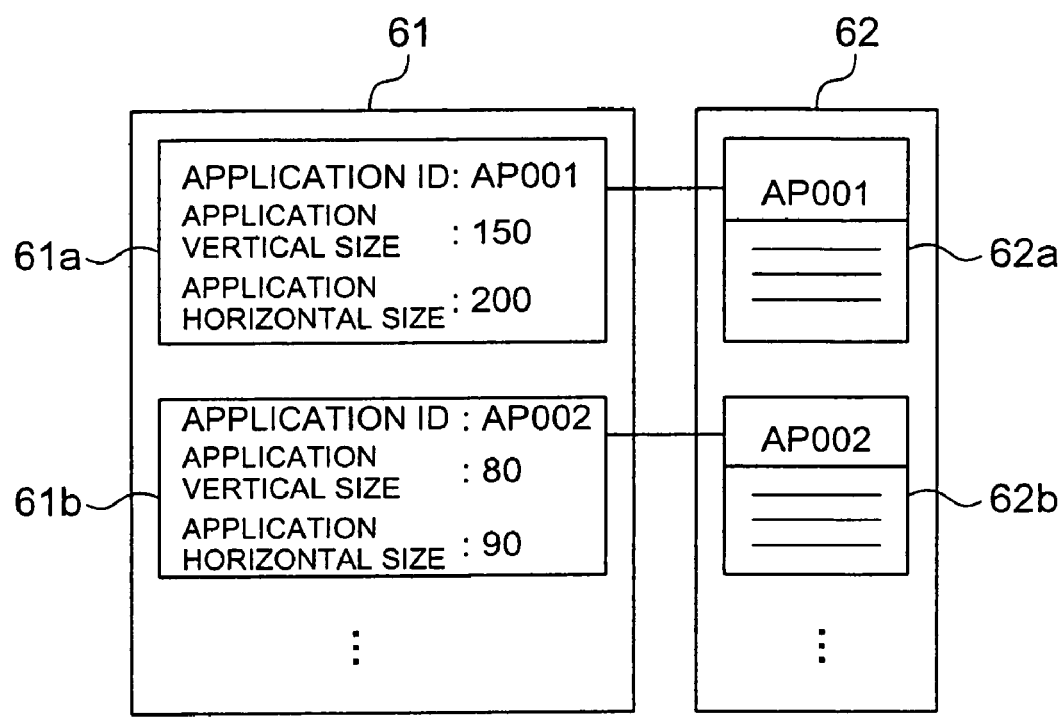
FIG. 3 shows an example of data storage in an ADF storage area and an application storage area.

Here, a description will be provided for an example of data storage within the ADF storage area 61 by referring to FIG. 3. As shown in FIG. 3, the ADF storage area 61 stores application IDs, and a plurality of ADFs 61a, 61b, (corresponding to the attribute data) that comprise at least data indicating application vertical sizes and application horizontal sizes.

The application IDs are data (for example, "AP001", "AP002", . . . ) which are uniquely allocated in order to identify applications. Further, so long as the application IDs are able to specify the applications stored, the application IDs are not limited to code data and may instead be text data showing the name of the application, a URL (Uniform Resource Locator) of the Web page from which the download originated, and so forth.

The application vertical size expresses the total width in the vertical direction of the assumed display area, which is designed to be used as the display area during the execution of an application, as a number of pixels. The application horizontal size expresses the total width in the horizontal direction of the assumed display area as a number of pixels.

The application storage area 62 is a program area for storing applications which are executed by the cellular phone 1. As shown in FIG. 3, applications 62a, 62b, are stored so as to correspond with the above application IDs. Therefore, the applications 62a, 62b are stored so as to correspond with the ADFs 61a, 61b, . . . via the application IDs.

Further, for the sake of expediency in the description, these data, namely the application IDs, the application vertical size, and the application horizontal size are constituted so as to be stored in the same storage area (the ADF storage area 61). However, so long as the storage format corresponds to one in which data can be read out, the constitution need not be such that storage is at least in the same storage area.

Returning to FIG. 2, the wireless unit 7 is a circuit comprising a modulation/demodulation section (not shown) for modulating/demodulating a signal, and encoding/decoding unit (not shown) for encoding/decoding a signal, and the wireless unit 7 comprises an antenna 7a. The antenna 7a is provided expandably at the top of the case of the cellular phone 1, and sends data to the base station B and receives data from the base station B.

During reception, the modulation/demodulation unit performs processing to demodulate a signal inputted via the antenna 7a, to a signal that can be processed by the encoding/decoding unit. On the other hand, during transmission, the modulation/demodulation unit performs processing to modulate a digital signal which has been converted by the encoding/decoding unit, to a signal that can be transmitted via radio. Further, the encoding/decoding unit is constituted by a CODEC, and, during reception, performs processing (decoding) to convert a digital signal inputted from the modulation/demodulation unit into an analog signal. On the other hand, during transmission, the modulation/demodulation section performs processing (encoding) to convert a voice signal or other analog signal into a digital signal, and compresses the converted digital signal into a data volume suitable for transmission.

The voice processor 9 is constituted by a converter and an amplifier, and the like, and comprises a microphone 9a and speaker 9b. During a telephone call, the voice processor 9 converts voice data inputted from the control unit 2 into an analog signal by means of the converter, and this analog signal passes via the amplifier before being emitted via the speaker 9b. Further, during a telephone call, the voice processor 9 converts, by means of the converter, a voice signal inputted via the microphone 9a into a digital signal which permits wireless communications, and then outputs this digital signal to the wireless unit 7.

Figure 4:
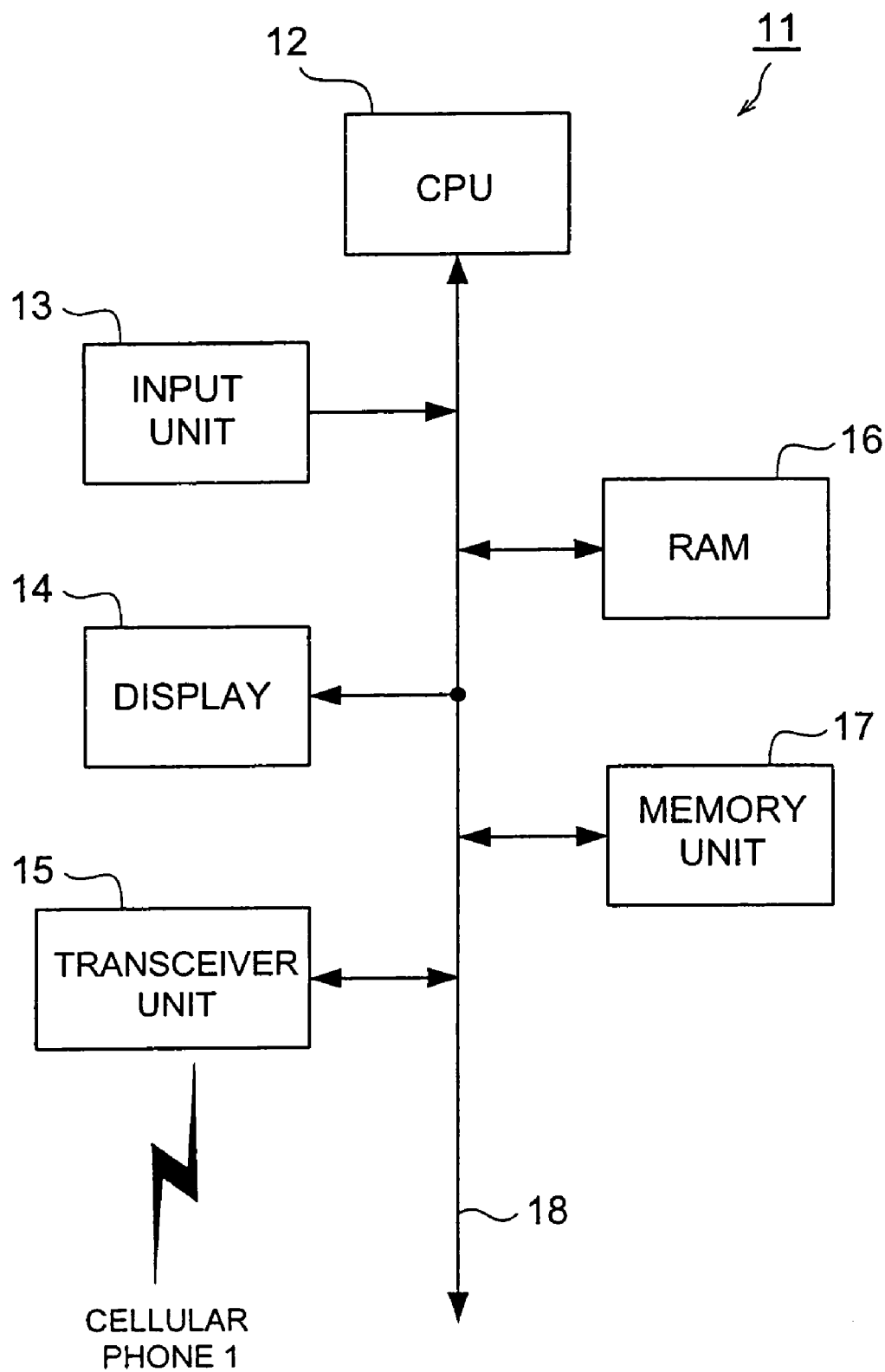
FIG. 4 is a block diagram showing the functional constitution of an application distribution server.

Next, the internal constitution of the application distribution server 11 will be outlined by referencing FIG. 4. As shown in FIG. 4, the application distribution server 11 is constituted comprising a CPU 12, an input unit 13, a display 14, a transceiver unit 15, a RAM 16, and a memory unit 17, these components being connected to one another by means of a bus 18.

The CPU 12 reads out a variety of programs which are stored in the memory unit 17 and expands these programs in the RAM 16 so as to perform centralized control of the components in accordance with these programs. Further, the CPU 12 executes transmission processing (see FIG. 5) which will be described subsequently, in accordance with the programs expanded in the RAM 16, and then stores the processing results in the RAM 16 and displays the results on the display 14. Further, the processing results stored in the RAM 16 are stored in the memory unit 17.

The input unit 13 is constituted comprising a keyboard, and a mouse and the like which allow an operator to set the contents of the ADF pertaining to the application which is to be distributed, and the input unit 13 outputs inputted data as an input-signal to the CPU 12.

The display 14 is constituted by display apparatus such as an LCD and a CRT (Cathode Ray Tube) and the like.

The transceiver unit 15 is connected via a wire line to the packet communications network N, and performs the reception of a request signal and the like from the cellular phone 1 as well as ADF and application transmissions or other transmissions to the cellular phone 1 through the base station B.

In the various processing whose execution is controlled by the CPU 12, the RAM 16 forms temporary storage areas for a variety of programs and ADF data, and the like, which are read out from the memory unit 17.

The memory unit 17 stores the variety of programs and ADF data, and the like, which are transmitted in the transmission processing described subsequently.

Figure 5:
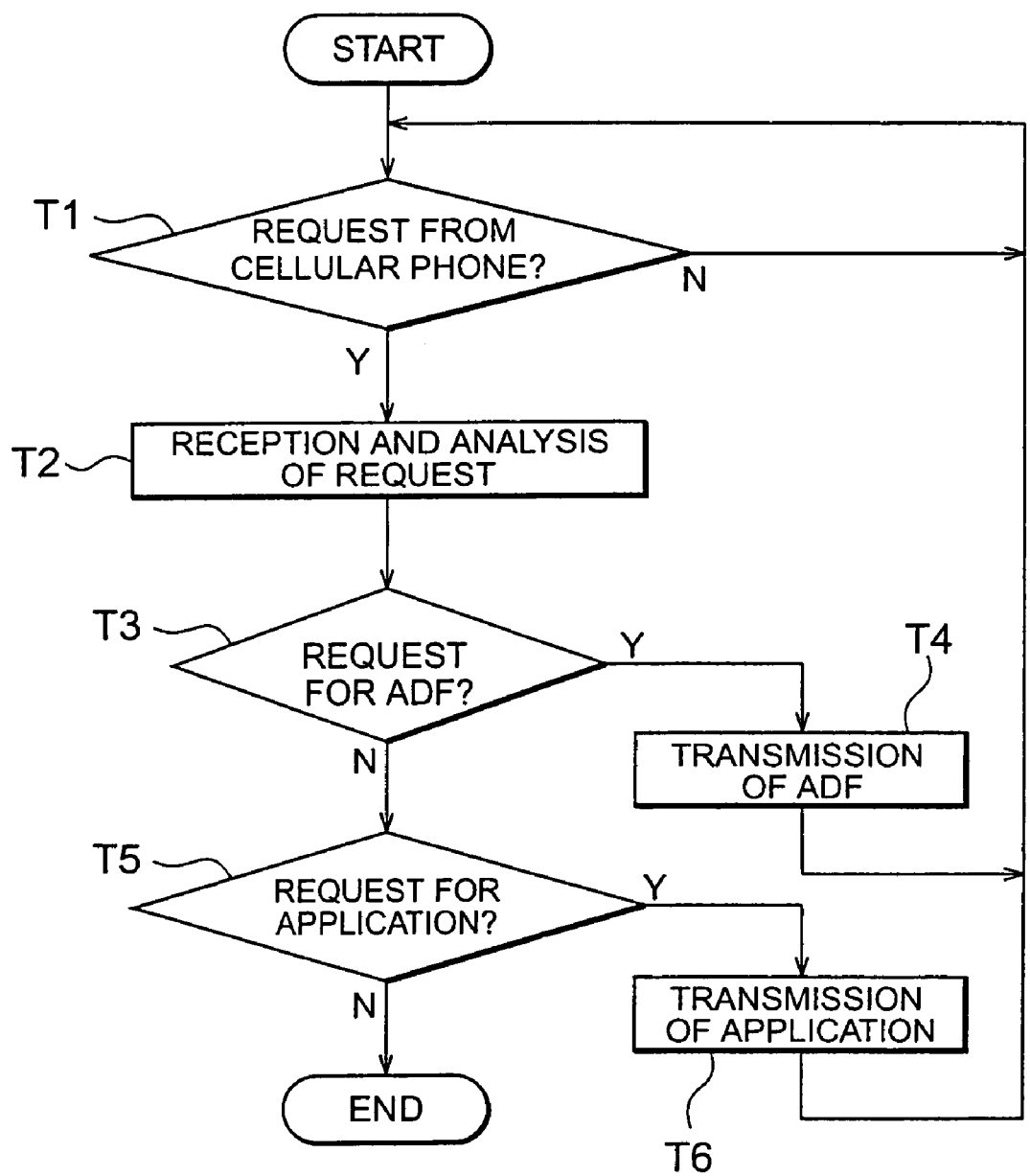
FIG. 5 is a flowchart to illustrate processing by the application distribution server.
Figure 6:
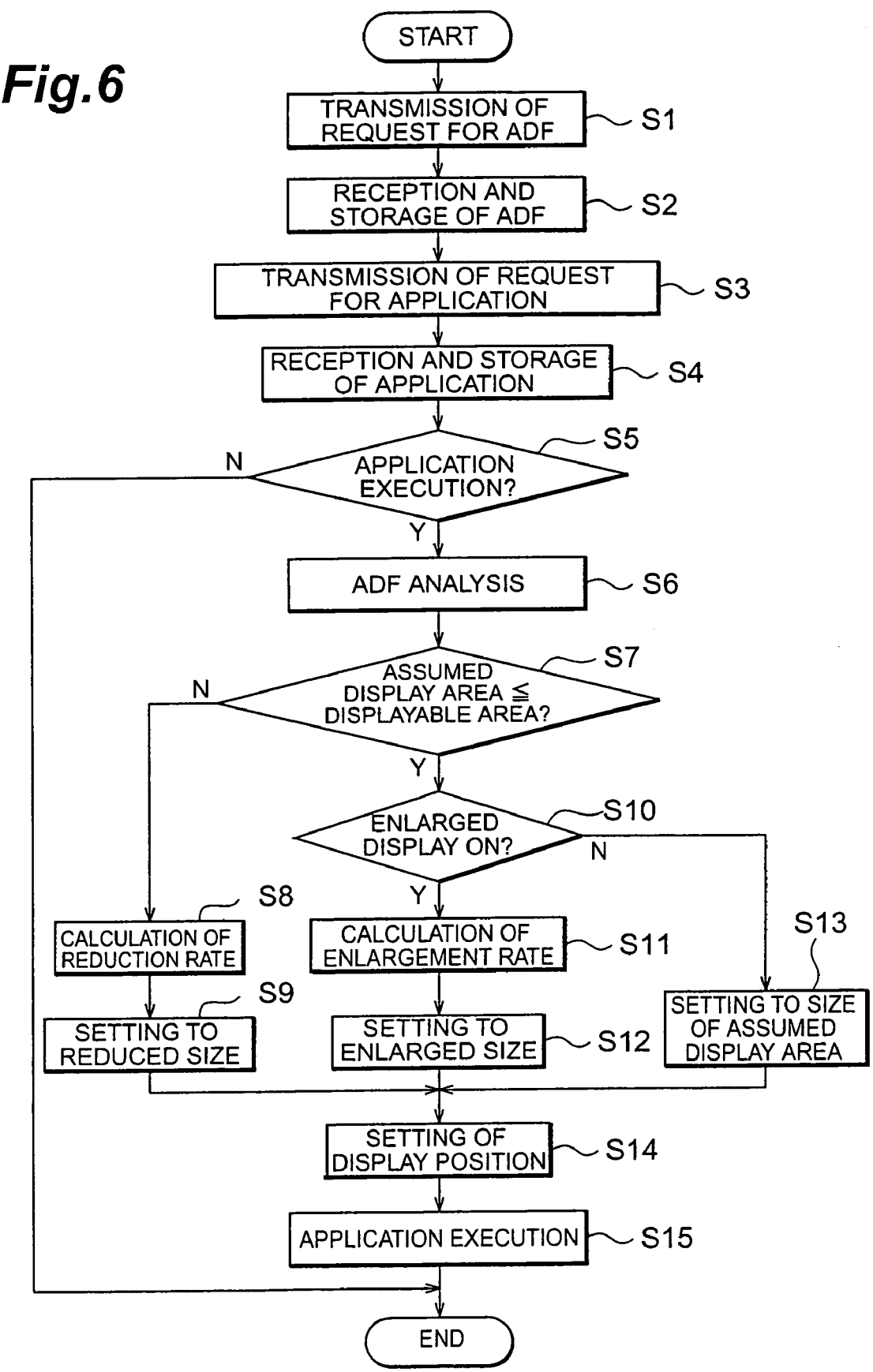
FIG. 6 is a flowchart to illustrate processing by the cellular phone according to a first embodiment.

Next, the operation of the cellular phone 1 and the application distribution server 11 according to the first embodiment will be described by referring to FIGS. 5 and 6. FIG. 5 is a flowchart to illustrate processing by the application distribution server 11, and FIG. 6 is a flowchart to illustrate processing by the cellular phone 1. Further, in the present embodiment, an example is described in which ADFs and applications are distributed in this order from the application distribution server 11 to the cellular phone 1.

The processing of the application distribution server 11 will be described first. In T1 of FIG. 5, the application distribution server 11 awaits reception of a request from the cellular phone 1 (such as an acquisition request for the ADF pertaining to a desired application, and a desired application acquisition request, for example). When a request is received from the cellular phone 1, the processing proceeds to T2 and the request is received and the content thereof is analyzed. Further, in T3, it is judged whether or not this request is an ADF acquisition request relating to a desired application, and if this request is an ADF acquisition request, the ADF pertaining to the desired application is transmitted to the cellular phone 1 in T4.

In T5 which follows, it is judged whether or not this request is a desired application acquisition request, and if this request is an application acquisition request, the desired application is transmitted to the cellular phone 1 in T6, whereupon the processing of FIG. 6 is complete. By means of the above processing in FIG. 5, the application distribution server 11 is capable of transmitting the ADF pertaining to a desired application along with the desired application, to the cellular phone 1 in accordance with the request from the cellular phone 1.

The processing of the cellular phone 1 will be described next. In S1 of FIG. 6, the cellular phone 1 first transmits an acquisition request for the ADF pertaining to the desired application to the application distribution server 11. Then, when the ADF has been transmitted by the application distribution server 11 in accordance with this request and by means of the above processing in FIG. 5, the ADF is received and stored in the ADF storage area 61 in S2.

In S3 which follows, an acquisition request for the desired application is transmitted. Then, when the desired application has been transmitted by the application distribution server 11 in accordance with this request and by means of the above processing of FIG. 5, this application is received and stored in the application storage area 62 in S4. At this point in time, the download to the cellular phone 1 of the desired application and the ADF which pertains to this application is complete. Further, here, in the absence of the above operation to instruct execution of the application, the processing of FIG. 6 ends.

When the above operation to instruct execution of the application is performed by the user of the cellular phone 1 in S5, the processing proceeds to S6, whereupon analysis of the ADF pertaining to this application is performed. Then, in S7, it is judged whether or not the assumed display area in this ADF fits into the displayable area of the screen 51 (that is, whether or not the application vertical size of the assumed display area is equal to or less than the vertical size of the displayable area and the application horizontal size of the assumed display area is equal to or less than the horizontal size of the displayable area).

As a result, in cases where the assumed display area exceeds the displayable area (that is, the application vertical size of the assumed display area exceeds the vertical size of the displayable area or the application horizontal size of the assumed display area exceeds the horizontal size of the displayable area), the processing proceeds to S8, and the reduction rate which permits all of the assumed display area to fit into the displayable area is calculated, and, in S9, the reduced size as a result of multiplying this reduction rate by the application vertical size and the application horizontal size of the assumed display area is set as the size of the application display area in the screen 51.

On the other hand, in cases where the assumed display area fits into the displayable area, the processing proceeds to S10 and it is judged whether or not the enlarged display function of the display 5 is ON. Further, the ON/OFF of the enlarged display function is set as a result of the user making inputs by means of the input unit 3 beforehand. Further, when the enlarged display function is ON, the processing proceeds to S11 and the enlargement rate within a range in which all of the assumed display area fits into the displayable area is calculated. Then, in S12, the enlarged size as a result of multiplying this enlargement rate by the application vertical size and the application horizontal size of the assumed display area is set as the size of the application display area in screen 51. Further, when the enlarged display function is OFF, the processing proceeds to S13 and the size of the assumed display area is set as the size of the application display area in the screen 51.

When the size of the application display area is set in S9, S12 and S13, the processing proceeds to S14 and the position of the display area is set to the center of the displayable area. Further, if all of the display area can fit into the displayable area, the display area may be set to a position other than the center of the displayable area. Then, the corresponding application is executed in S15.

Figure 8A:
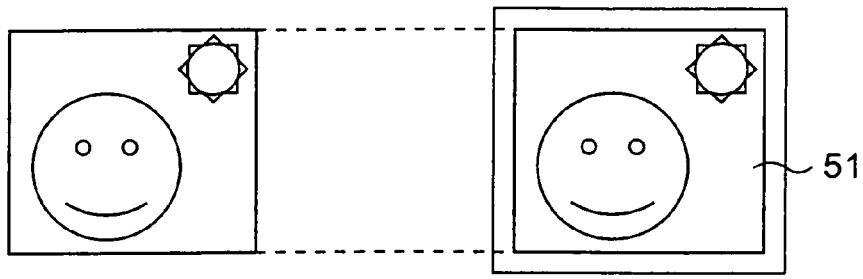
FIG. 8A shows an example of an application software display on the display screen in a case where the assumed display area size and the displayable area size are the same.
Figure 8B:
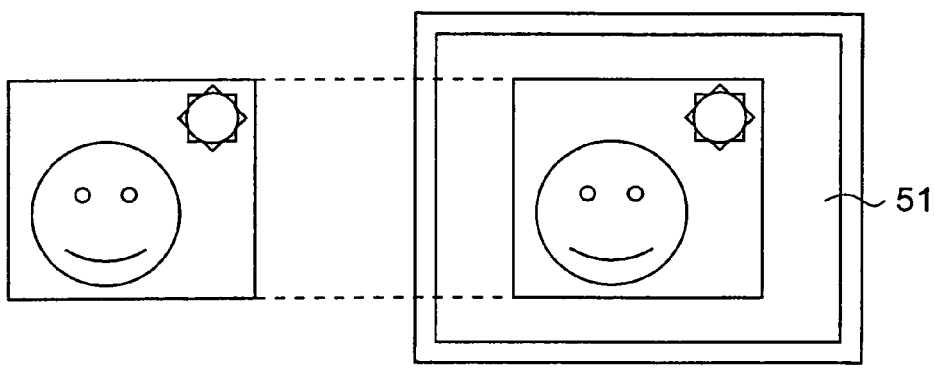
FIG. 8B shows an example of an application software display on the display screen in a case where the assumed display area size is smaller than the displayable area size and when the display function is OFF.
Figure 8C:
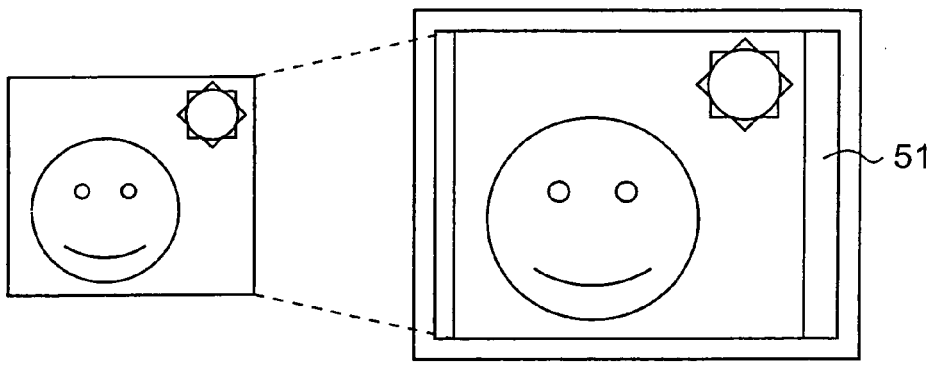
Figure 8D:
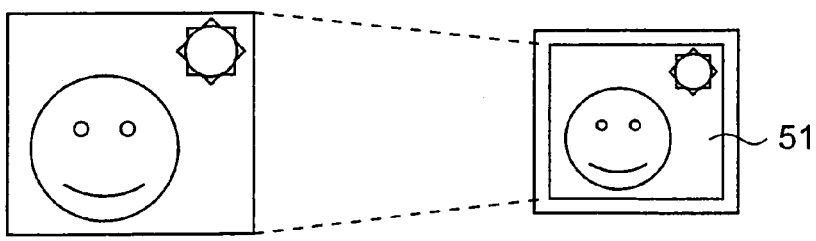
FIG. 8D shows an example of an application software display on the display screen in a case where the assumed display area size is larger than the displayable area size.

At such time, in cases where the size of the application assumed display area and the size of the displayable area of the screen 51 are the same, the application is displayed in the screen 51 in a state in which the assumed display area and the displayable area match, as shown in FIG. 8A. Further, in cases where the size of the assumed display area is smaller than the size of the displayable area, when the enlarged display function of the display 5 is OFF, the application is the size of the assumed display area and is displayed in the center of the screen 51, as shown in FIG. 8B. When the enlarged display function of the display 5 is ON, the application is displayed with a size which is produced as a result of enlarging the size of the assumed display area, as shown in FIG. 8C. Furthermore, in cases where the size of the assumed display area is larger than the size of the displayable area, the application is displayed with a size which is produced as a result of reducing the size of the assumed display area, as shown in FIG. 8D.

As described hereinabove, according to the cellular phone 1 of the first embodiment, upon execution of an application which is distributed by the application distribution server 11, the control unit 2 judges whether or not the assumed display area fits into the displayable area on the basis of the assumed display area data in the ADF which corresponds with the application and which is received from the application distribution server 11 beforehand, and data for the displayable area of the screen 51, and in cases where this assumed display area exceeds the displayable area, the control unit 2 sets, as the size of the display area, a size which is produced by reducing the size of the assumed display area so that all of the assumed display area fits into the displayable area, and also sets the position of the display area to the center of the displayable area so that all of the display area whose-size has been set fits into the displayable area. Accordingly, even in cases where the assumed display area of the application distributed by the application distribution server 11 has been designed with a size that exceeds the displayable area of the screen 51, it is possible to prevent part of the image from being cut from the top of the screen 51, whereby the application can be displayed in an optimum display area.

Further, in cases where the result of the above-described judgment by the control unit 2 is that the assumed display area fits into the displayable area, turning OFF the enlarged display function of the display makes it possible to display the application at the center of the screen 51 so as to have the size of the assumed display area, and here, by affording the circumference of the application display area a color that has a high contrast with respect to the display area, it is possible to provide a favorable appearance and to increase user convenience. On the other hand, by turning ON the enlarged display function of the display 5, even in cases where the assumed display area of the application is much smaller than the displayable area of the screen 51, the application can be displayed having a size which is enlarged beyond the size of the assumed display area, whereby user convenience can be improved.

SECOND EMBODIMENT

Next, a description will be provided for the cellular phone 1 according to the second embodiment. The display 5 of the cellular phone 1 according to the second embodiment does not comprise a reduced display function for the screen 51 (comprises only an enlarged display function), and the control unit 2 executes cellular phone processing (see FIG. 7) which is described subsequently. Further, the other constitutions of the cellular phone 1, the overall constitution of the application distribution system 100 which the cellular phone 1 applies, the internal constitution of the application distribution server 11 of the application distribution system 100, and the operation thereof, are like those of the first embodiment described above, and a description thereof is therefore omitted here.

Figure 7:
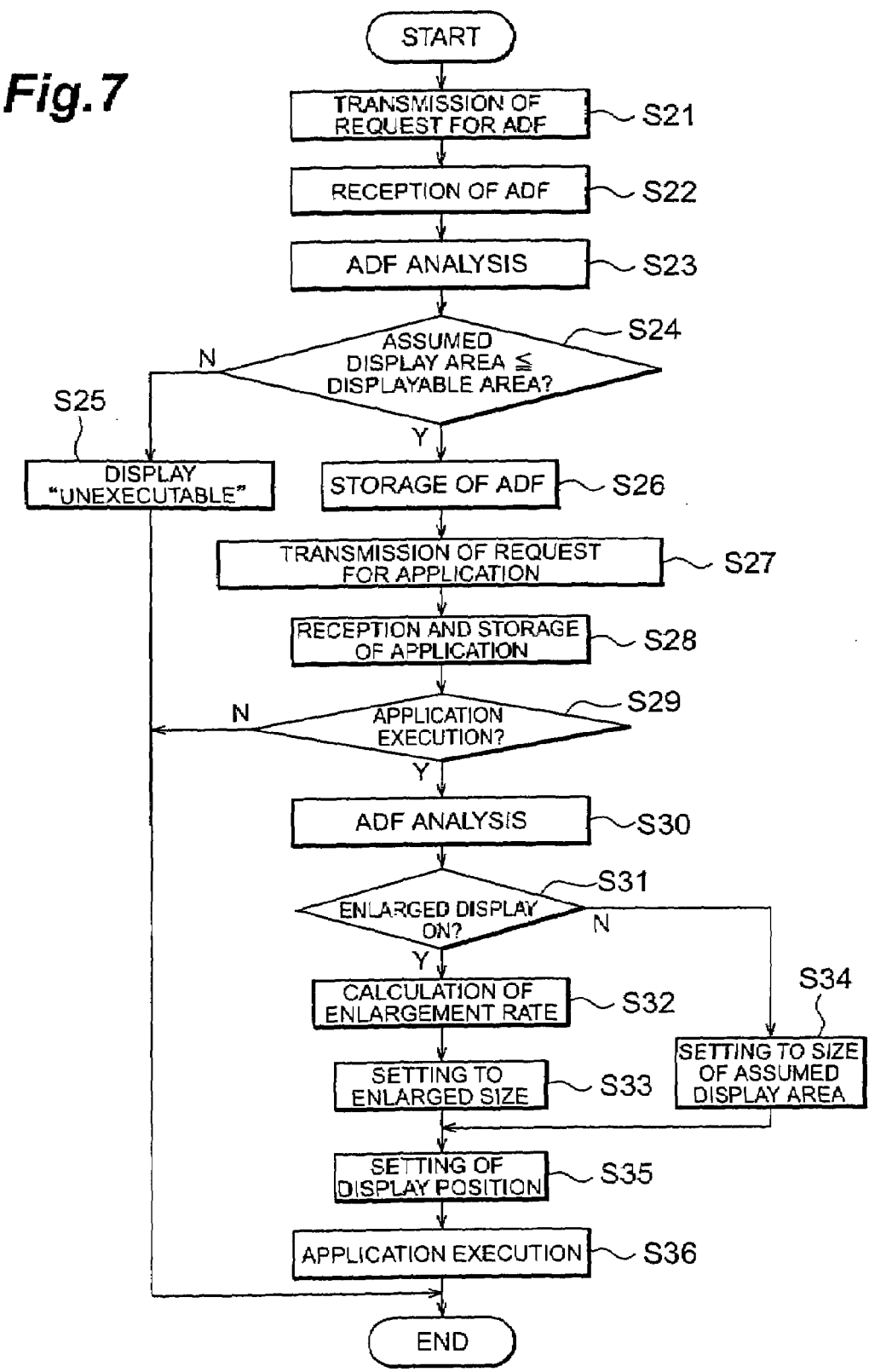
FIG. 7 is a flowchart to illustrate processing by the cellular phone according to a second embodiment.

The processing of the cellular phone 1 of the second embodiment will now be described by referring to FIG. 7. In S21 of FIG. 7, the cellular phone 1 first transmits an acquisition request for the ADF pertaining to the desired application to the application distribution server 11. Then, when the ADF has been transmitted in accordance with this request by the application distribution server 11 and by means of the above processing of FIG. 5, the ADF is received in S22. Then, the ADF is analyzed in S23, and in S24 it is judged whether or not the assumed display area in the ADF fits into the displayable area of the screen 51 (that is, whether or not the application vertical size of the assumed display area is equal to or less than the vertical size of the displayable area and the application horizontal size of the assumed display area is equal to or less than the horizontal size of the displayable area).

As a result, in a case where the assumed display area exceeds the displayable area (in other words, in cases where the application vertical size of the assumed display area exceeds the vertical size of the displayable area or the application horizontal size of the assumed display area exceeds the horizontal size of the displayable area), the processing proceeds to S25, and the fact that the application which corresponds with this ADF is unexecutable is displayed on the screen 51.

On the other hand, in cases where the assumed display area fits into the displayable area, the processing proceeds to S26, and the ADF is stored in the ADF storage area 61. In S27 that follows, an acquisition request for the desired application is transmitted. Then, when the desired application has been transmitted in accordance with this request by the application distribution server 11 and by means of the above processing of FIG. 5, this application is received and stored in the application storage area 62 in S28. At this point in time, the download to the cellular phone 1 of the desired application and the ADF which pertains to this application is complete. Further, here, in the absence of the above operation to instruct execution of the application, the processing of FIG. 7 ends.

When an operation to instruct execution of the application is performed by the user of the cellular phone 1 in S29, the processing proceeds to S30, and analysis of the corresponding ADF which is saved in S26 is carried out. Then, in S31, it is judged whether or not the enlarged display function of the display unit 5 is ON. Further, the ON/OFF of the enlarged display function is set as a result of the user making inputs by means of the input unit 3 beforehand.

As a result, when the enlarged display function is ON, the processing proceeds to S32 and the enlargement rate within a range in which all of the assumed display area fits into the displayable area is calculated. Then, in S33; the enlarged size as a result of multiplying this enlargement rate by the application vertical size and the application horizontal size of the assumed display area is set as the size of the application display area in screen 51. Further, when the enlarged display function is OFF, the processing proceeds to S34 and the size of the assumed display area is set as the size of the application display area in the screen 51.

When the size of the application display area is set in S33 and S34, the processing proceeds to S35 and the position of the display area is set to the center of the displayable area. Further, if all of the display area can fit into the displayable area, the display area may be set to a position other than the center of the displayable area. Then, the corresponding application is executed in S36.

As described above, according to the cellular phone 1 of the second embodiment, even if the display unit 5 does not comprise a reduced display function for the screen 51, in cases where the assumed display area of the application fits into the displayable area of the screen 51, the application can be displayed in the optimum display area similarly to the first embodiment.

Preferred embodiments of the present invention were described in detail hereinabove, but it goes without saying that the present invention is not limited to or by the above embodiments.

For example, as a result of the user inputting a desired position on the display screen by means of the input unit 3 and so forth, the position of the display area of an application which is being executed can be changed to the desired position. This means that it is accordingly possible to fulfill individual user requests and to improve user convenience further.

Moreover, in the above embodiments, the present invention was illustrated with a cellular phone as the mobile communication terminal but can be applied with any information device that comprises a wireless communications function such as a PHS (Personal Handyphone System), or a PDA (Personal Digital Assistance), and so forth. It goes without saying that the applications which are permitted to apply the present invention are not particularly limited either.

Further, as far as the order for the transmission of ADFs and applications to the cellular phone is concerned, these ADFs and applications may be transmitted simultaneously or may be transmitted such that the ADFs are transmitted after the applications.

In addition, the above embodiments indicate a form in which the cellular phone that corresponds to the mobile communication terminal of the present invention receives application software and attribute data from an application distribution server. However, the mobile communication terminal according to the present invention may receive application software and attribute data from an information processing apparatus other than an application distribution server, or may receive application software and attribute data via a stick memory or other storage medium.

INDUSTRIAL APPLICABILITY

As described hereinabove, according to the present invention, the receiving means receive application software, and attribute data that indicates an assumed display area that is to be used as a display area during execution of the application software and, therefore, controlling means are capable of controlling the display area of the application software in the display screen of the displaying means on the basis of the received attribute data and display screen displayable area data, whereby the application software can be executed using an optimum display area. It is accordingly unnecessary to prepare display area sizes which can be used by application software for each displayable area of a variety of mobile communication terminals, whereby application software can be made generic.

The invention claimed is:

1. A mobile communication terminal, comprising:
    displaying means that include a display screen and that serve to display information on this display screen;
    receiving means for receiving application software, and attribute data that indicates an assumed display area that is to be used as a display area during execution of the application software; and
    controlling means for controlling the display area of the application software in the display screen of the displaying means on the basis of the attribute data received by the receiving means and displayable area data that indicates the displayable area of the display screen; and the controlling means comprises:
    judging means for judging whether or not the assumed display area fits into the displayable area on the basis of the attribute data and the displayable area data;
    size setting means which, in cases where the result of the judgment by the judging means is that the assumed display area fits into the displayable area, set the size of the assumed display area as the size of the display area, and which, in case where the assumed display area exceeds the displayable area, set a size which is produced as a result of reducing the size of the assumed display area so that the assumed display area fits into the displayable area as the size of the display area; and
    position setting means for setting the position of the display area to a predetermined position in the displayable area so that the display area whose size has been set by the size setting means fits into the displayable area.

2. The mobile communication terminal according to claim 1, wherein the controlling means further comprise:
    Prohibiting means which, in cases where the diaplaying means do not comprise a reduced display function for the display screen and the assumed display area exceeds the displayable area, prohibit the setting of the size of the display area which is performed by the size setting means.

3. The mobile communication terminal according to claim 1, wherein in cases where the result of the judgment by the judging means is that the assumed display area fits into the displayable area, the size setting means set a size which is produced as a result of enlarging the size of the assumed display area within a range that fits into the displayable area as the size of the display area.

4. The mobile communication terminal according to claim 1, wherein the predetermined position is approximately at the center o the displayable area.

5. The mobile communication terminal according to claim 1, further comprising designating means which allow the user to designate the predetermined position.

6. A mobile communication terminal for communicating with an application software distribution apparatus that distributes application software, comprising:
  displaying means that include a display screen and that serve to display information on this display screen;
  receiving means for receiving, from the application software distribution apparatus, the application software, and attribute data that indicates an assumed display area that is to be used as a display area during execution of the application software; and
  controlling means for controlling the display area of the application software in the display screen of the displaying means on the basis of the attribute data received by the receiving means and displayable area data that indicates the displayable area of the display screen; and the controlling means comprises:
  judging means for judging whether or not the assumed display area fits into the displayable area on the basis of the attribute data and the displayable area data;
  size setting means which, in cases where the result of the judgment by the judging means is that the assumed display area fits into the displayable area, set the size of the assumed display area as the size of the display area, and which, in case where the assumed display area exceeds the displayable area, set a size which is produced as a result of reducing the size of the assumed display area so that the assumed display area fits into the displayable area as the size of the display area; and
  position setting means for setting the position of the display area to a predetermined position in the displayable area so that the display area whose size has been set by the size setting means fits into the displayable area.

7. A display control method which is executed by a mobile communication terminal comprising displaying means that include a display screen and that serve to display information on the display screen, comprising:
  a receiving step of receiving application software, and attribute data that indicates an assumed display area that is to be used as a display area during execution of the application software; and
  a controlling step of controlling the display area of the application software in the display screen of the displaying means on the basis of the attribute data received in the receiving step and displayable area data that indicates the displayable area of the display screen; and the controlling step comprises:
  a judging step of judging whether or not the assumed display area fits into the displayable area on the basis of the attribute data and the displayable area data;
  a sizing setting step of setting the size of the assumed display area as the size of the display area in cases where the result of the judgment in the judging step is that the assumed display area fits into the displayable area, and of setting a size which is produced as a result of reducing the size of the assumed display area so that the assumed display area fits into the displayable area as the size of the display area in cases where the assumed display area exceeds the displayable area; and
  a position setting step of setting the position of the display area to a predetermined position in the displayable area so that the display area whose size has been set in the size setting step fits into the displayable area.

8. The display control method according to claim 7, wherein in cases where the displaying means do not comprise a reduced display function for the display screen and the assumed display area exceeds the displayable area, the setting of the size of the display area in the size setting step is prohibited.

9. The display control method according to claim 7, wherein in cases where the result of the judgment in the judging step is that the assumed display area fits into the displayable area, the size setting step sets a size which is produced as a result of enlarging the size of the assumed display area within a range that fits into the displayable area as the size of the display area.

10. The display control method according to claim 7, wherein the predetermined position is approximately at the center of the displayable area.

11. A display control method which is executed by a mobile communication terminal for communicating with an application software distribution apparatus that distributes application software and that comprise displaying means that include a display screen and that serve to display information on the display screen, comprising:
  a receiving step of receiving, from the application software distribution apparatus, the application software, and attribute data that indicates an assumed display area that is to be used as a display area during execution of the application software; and
  a controlling step of controlling the display area of the application software in the display screen of the displaying means on the basis of the attribute data received in the receiving step and displayable area data that indicates the displayable area of the display screen; and the controlling step comprises:
  a judging step of judging whether or not the assumed display area fits into the displayable area on the basis of the attribute data and the displayable area data;
  a sizing setting step of setting the size of the assumed display area as the size of the display area in cases where the result of the judgment in the judging step is that the assumed display area fits into the displayable area, and of setting a size which is produced as a result of reducing the size of the assumed display area so that the assumed display area fits into the displayable area as the size of the display area in cases where the assumed display area exceeds the displayable area; and
  a position setting step of setting the position of the display area to a predetermined position in the displayable area so that the display area whose size has been set in the size setting step fits into the displayable area.

* * * * *